Patented Nov. 6, 1928.

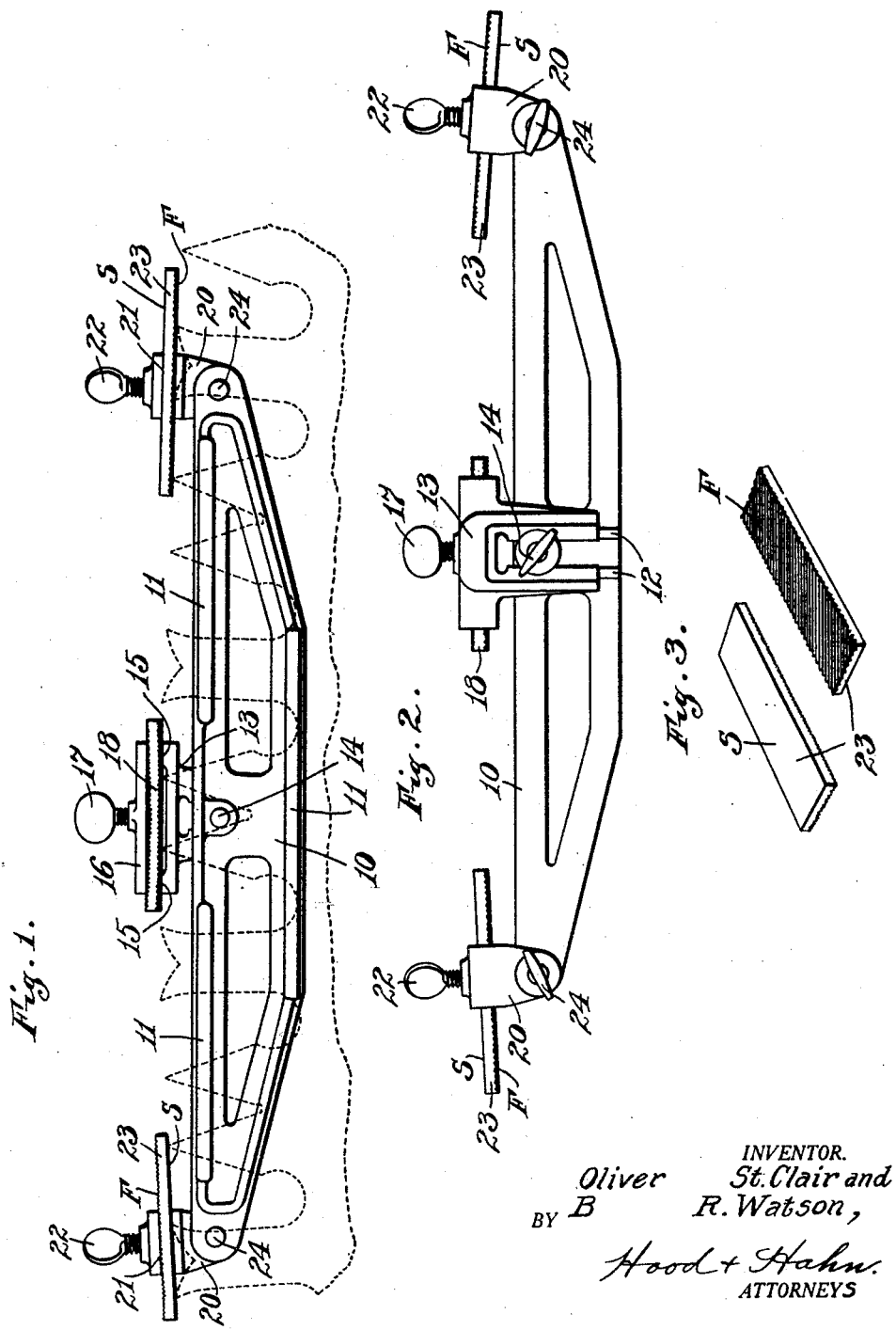

1,690,707

UNITED STATES PATENT OFFICE.

OLIVER ST. CLAIR, OF INDIANAPOLIS, INDIANA, AND BAZEL R. WATSON, OF SNOHOMISH, WASHINGTON, ASSIGNORS TO E. C. ATKINS & COMPANY, OF INDIANAPOLIS, INDIANA, A CORPORATION OF INDIANA.

SAW JOINTER.

Application filed September 16, 1926. Serial No. 135,737.

The object of our invention is to produce an efficient jointer by means of which large saws may be quickly and accurately jointed.

The accompanying drawings illustrate our invention.

Fig. 1 is a side elevation of the saw side of our improved jointer; Fig. 2 an elevation of the opposite side; and Fig. 3 perspective views of one of the file-shoe elements.

In the drawings 10 indicates the main body of the jointer, a light casting considerably longer than it is wide and provided on one face with several guide surfaces 11, 11 which are accurately machined so as to all lie in one plane against which the face of the saw to be jointed will lie.

At the middle, on the back side, body 10 is provided with a pair of transverse guide ribs 12 upon which is slidably mounted a file holder 13 which may be held in any desired position of adjustment by means of the clamping screw 14. Holder 13 is provided with a pair of separated file receiving platforms 15, 15 which are overhung by a flange 16 through the middle of which is threaded the file-clamping thumb screw 17, the arrangement being such that a file 18 may be clamped upon platforms 15 and slightly bowed downwardly at its middle so as to furnish a single cutting line.

At each end of body 10 we provide a clamping dog 20 provided with a jaw 21 and thumb-screw 22 to receive a combination file-shoe 23. This file-shoe 23 is provided with one smooth face S and one file face F for a purpose which will appear. Each dog 20 is conveniently adjustably secured to main body 10 by a clamping thumbscrew 24 which also forms a pivot for the dog, the arrangement being such that the file-shoes 23 may be set at slight opposite angles to file 18.

In operation one file-shoe 23 is set with its file face F down and the other one with its smooth face S down; file 18 is firmly clamped in place and slightly bowed downwardly at its middle; dogs 20 adjusted angularly to conform to the curvature of the saw to be jointed; and holder 13 vertically adjusted until file 18 engages the tips of the teeth of the saw. The forward file-shoe 23 will have its file face active so that both it and file 18 will act upon the teeth of the saw to bring their tips to proper relative positions, while the rear file shoe 23 rides smoothly upon the saw teeth and serves as a curvature gage.

We claim as our invention:

1. A saw jointer comprising a rigid main body, a file holder laterally adjustable on the main body, and two file-shoe dogs one mounted at each end of the main body and angularly adjustable thereon, the adjustment of the file holder on the main body being independent of the dogs, each of said dogs having a jaw formed to receive and hold a file-shoe element.

2. A saw jointer comprising a main body, a transverse guide at the middle of said body, a file holder slidably mounted on said guide and provided with a pair of separated file platforms and an inwardly acting intermediate clamping screw, two file-shoe dogs one at each end of the main body and each having a jaw formed to receive a reversible file-shoe, and two clamping screws, one engaging each dog and forming a pivoted clamping support therefor.

In witness whereof, we have hereunto set our hands respectively at Seattle, Washington, and Indianapolis, Indiana on the 9th day of August, 1926, and the 27th day of July, 1926.

BAZEL R. WATSON.
OLIVER ST. CLAIR.